No. 649,097. Patented May 8, 1900.
C. BEINDORF.
STOVEPIPE.
(Application filed Apr. 6, 1899.)
(No Model.)
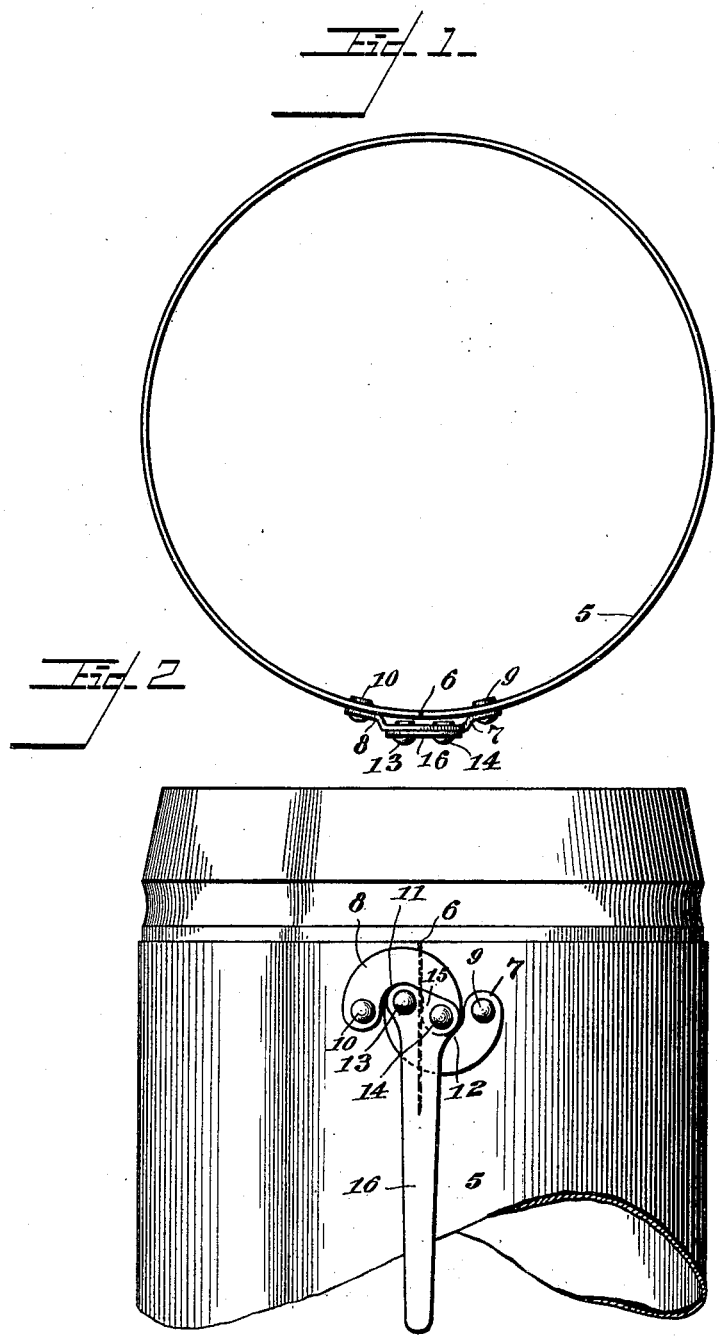

UNITED STATES PATENT OFFICE.

CHARLES BEINDORF, OF LITCHFIELD, ILLINOIS.

STOVEPIPE.

SPECIFICATION forming part of Letters Patent No. 649,097, dated May 8, 1900.

Application filed April 6, 1899. Serial No. 712,032. (No model.)

*To all whom it may concern:*

Be it known that I, CHARLES BEINDORF, a citizen of the United States, and a resident of Litchfield, in the county of Montgomery and State of Illinois, have invented an Improvement in Stovepipes, of which the following is a specification.

This invention relates to stovepipes in general, and more particularly to the coupling means therefor; and it has for its object to provide in connection with a stovepipe means for varying the diameter at the end of the pipe to permit the insertion of a coupling-nipple or the end of an adjacent section of pipe and to clamp the expanded end of the pipe upon the nipple or pipe-section disposed therein.

A further object of the invention is to provide a construction which will be simple in its operation and cheap in its construction and which when operated to perform the clamping action will be automatically held against accidental displacement.

In the drawings forming a portion of this specification, and in which like reference-numerals indicate corresponding parts in the several views, Figure 1 is an end view of a pipe-section, showing the longitudinal slot therein and the arrangement of the clamping means. Fig. 2 is a side elevation of the end of a pipe-section with the clamping mechanism in its operative position.

Referring now to the drawings, 5 represents a portion of a section of stovepipe having a longitudinal slot 6 leading downwardly from one end thereof and which slot is of sufficient width to permit the contraction of the diameter of the end of the pipe to tightly clamp it upon an opposing pipe-section or nipple which may have been previously inserted in the slotted end.

At each side of the slot 6 and equidistant therefrom are pivoted arc-shaped links 7 and 8 through the medium of rivets 9 and 10 passed therethrough and into the material of the pipe-section. These arc-shaped links include somewhat more than one hundred and eighty degrees, and the inclosures of these links (indicated at 11 and 12 in Fig. 2) have equal diameters somewhat greater than the widths of the links. The rivets 9 and 10 are so spaced from the slot 6 that the links 7 and 8 may be caused to lie with the free end of one link within the inclosure of the other. Pivotally connected with the otherwise free ends of the links 7 and 8, through the medium of pivots 13 and 14, is the head 15 of a hand-lever 16, the pivot 14 in its passage to the position shown in Fig. 2 crossing a line connecting the centers of the pivots 9 and 10, while the pivot 13 crosses the same line in its similar passage—that is, when the two links are in mutual engagement their pivots 13 and 14 lie beyond the dead-centers of their respective links. In order to maintain this mutual engagement of the links, the ends thereof are formed semicircular, as shown, and are adapted to lie in the recesses 17 of the opposing links, these recesses being formed by the compound curvature of the inner wall of each link.

As shown in Fig. 2 of the drawings, the pivots 13 and 14 lie in a line at an angle to a line connecting the pivots 9 and 10, and the head of the lever 16 is correspondingly formed in order that the handle of the lever when in an operative position will lie at right angles to a line connecting the pivots 9 and 10 and longitudinally of the pipe-section.

From the above description it will be seen that if the end of the lever 16 be rotated to the right the links will be moved from their mutual engagement, when the end of the pipe-section may be expanded or will expand, due to its elasticity, the initial movement of the lever, however, acting to expand the end of the pipe due to the movement of the pivots 13 and 14 over their dead-centers. A nipple or an adjoining pipe-section may then be inserted, and by moving the lever to the position shown the pipe-section will be contracted to clamp it upon the opposing section or nipple.

It will of course be understood that in practice the slot 6 may have any dimensions desired, as may also the links and the lever, and that the device may be employed upon pipes for any purpose.

What I claim is—

In a stovepipe-fastener, the combination with a stovepipe-section, which is slotted longitudinally, of a pair of opposite arcuate links transversely overlapping the slot, and having their respective outer ends pivotally connected to the stovepipe and at opposite sides of the slot, the inner concaved sides of the links being arranged adjacent to each other, and the inner free ends of the links being normally interhooked, and an operating device, having a transverse head, which is pivotally connected to the inner free ends of the links, to interhook and disengage the latter.

CHAS. BEINDORF.

Witnesses:
E. M. AUSTIN,
ELI MILLER.